J. H. YOUNG.
AX.
APPLICATION FILED MAR. 5, 1920.
1,348,920. Patented Aug. 10, 1920.
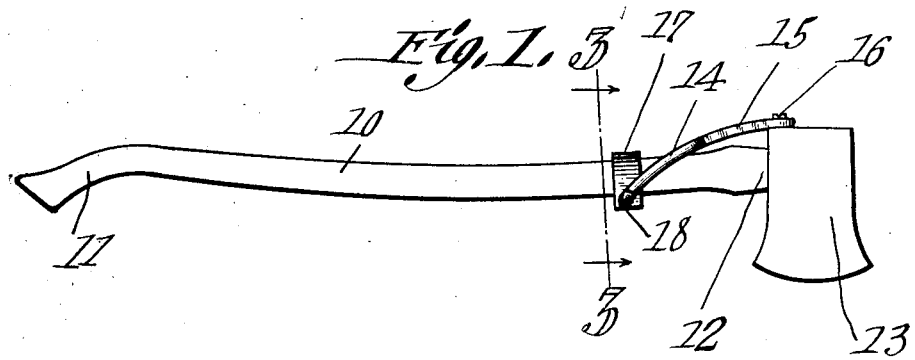
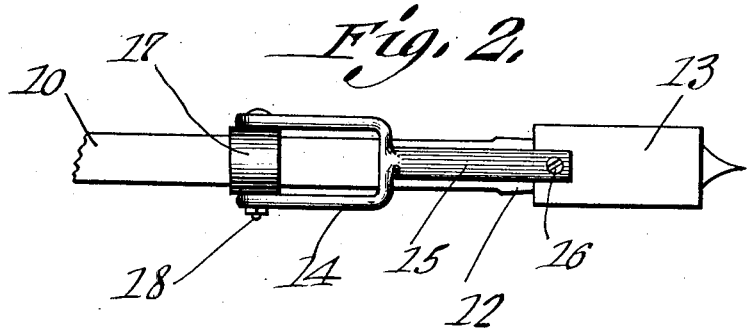
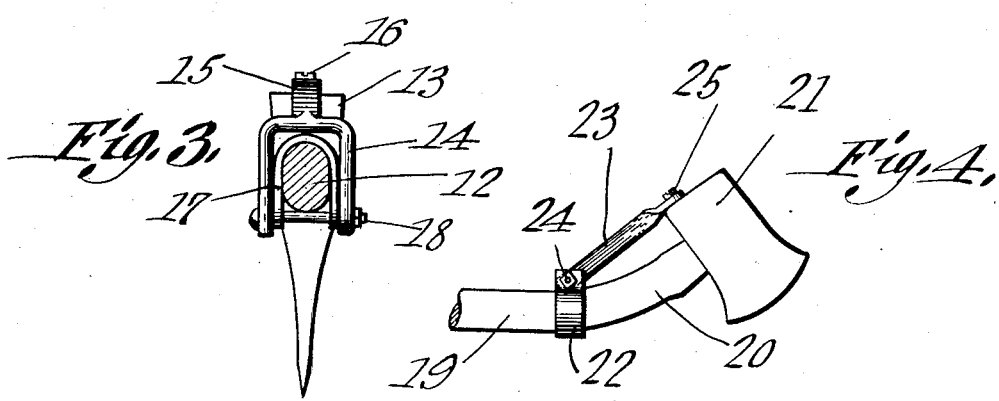
J. H. Young, Inventor

UNITED STATES PATENT OFFICE.

JOHN H. YOUNG, OF BARTLESVILLE, OKLAHOMA.

AX.

1,348,920.   Specification of Letters Patent.   Patented Aug. 10, 1920.

Application filed March 5, 1920. Serial No. 363,434.

*To all whom it may concern:*

Be it known that I, JOHN H. YOUNG, a citizen of the United States, residing at Bartlesville, in the county of Washington and State of Oklahoma, have invented a new and useful Ax, of which the following is a specification.

This invention relates to an improved ax and more particularly to an ax adapted for use in chopping down or cutting trees close to the ground.

It is the object of the invention to provide an improved ax and brace for the handle thereof, whereby the ax may be used to cut closer to the ground without striking the hands and so that the handle or helve of the ax will not be broken when removing the head from the wood, thus permitting the handle to be made curved or longer than ordinary, so that a more effective blow may be delivered.

With the above and other objects in view which will appear as the description proceeds, the invention resides in the combination and arrangement of parts and in the details of construction hereinafter described and claimed, it being understood that within the scope of what is claimed, changes in the precise embodiment of the invention shown can be made without departing from the spirit of the invention.

In the accompanying drawings:

Figure 1 is a side elevation of an ax constructed in accordance with the invention and provided with the improved brace;

Fig. 2 is an enlarged fragmentary plan view thereof;

Fig. 3 is a sectional view on the line 3—3 of Fig. 1; and

Fig. 4 is a side elevation of a modified form of ax, only a fragmentary portion of the handle thereof being shown.

Referring to the drawings in detail, in which like reference characters designate corresponding parts throughout the several views, my improved ax is shown as comprising a handle 10 of the straight or poll handle type formed at one end with a curved gripping portion 11 and the helve end thereof indicated at 12 carries the ax head 13 in the ordinary way. The handle 10 is made considerably longer than usual, preferably about one foot longer than an ordinary handle, so as to give increase leverage and permits use of the ax while standing in an upright position.

In order to prevent the handle from breaking at the helve or at any other point adjacent to the ax head when removing the latter from the wood, bracing means are provided, consisting of a curved forked or Y-shaped brace 14 having the shank 15 thereof secured to the head of the ax at the top edge or face thereof, as by means of a fastening screw or the like 16, which is engaged through an aperture in the shank portion at the extremity of the latter and into a threaded socket in the head.

The branching portions of the brace extend on either side of the handle in a rearwardly and downwardly curved direction, for connection with a clevis clamp or sleeve 17, which encircles the handle and is provided with a connecting bolt 18 between the jaws or sides thereof, engaging the apertured branching portions or furcations of the fork, as shown. As the clevis bears against the top edge of the handle, when the ax is driven into the wood, and then pressure is exerted against the handle to remove the ax blade, this pressure will be transmitted to the head through the medium of the brace and clamp, thus creating a leverage on the ax head whereby breaking of the handle or helve will be prevented, while greatly facilitating the loosening of the ax blade. As the handle is made about one foot longer than the ordinary handle, the device can be used while standing in a comparatively erect position, and the ax is especially adapted for cutting trees close to the surface of the ground, in view of the facility for removing the blade as specified. It is also to be understood that the device can be used on any type of ax, and that when timber land cleared with this device is planted with grass seed, the stumps will lie beneath the ground surface and any twigs branching therefrom can be cut off by a mowing machine.

In Fig. 4 of the drawings, the handle 19 is shown provided with a curved portion 20 adjacent to the head 21, a clevis clamp 22 being disposed on the handle adjacent to the curved portion in a position reversed to that described in connection with clevis clamp 17 and having the opposed sides or jaws thereof, connected with the head through the medium of a brace or rod 23. This brace is connected to the clamp as shown at 24, a bolt or other transverse connection being provided for this purpose and the opposite end of the brace or rod being apertured and flat for receiving a securing screw or the like 25. By this construction, it will be seen that the handle will not strike the tree trunk or wood to be cut, and this is especially so owing to the circular shape thereof, for if the blade should not strike it squarely, the handle adjacent to the head of the ax would strike the wood and possibly be cracked. The curved formation draws the handle away from the wood or ground, and thereby permits the tree to be cut close to the surface of the ground without danger of striking the hands or breaking the handle. However, the brace does not interfere with the use of the ax in the ordinary way and even though the ax sinks deeply into the wood, it may be removed by means of the brace as described.

Having thus described the invention what I claim is:

1. An ax comprising a head, a handle having a curved portion adjacent to the helve thereof extending away from the edge of the head, a brace detachably connected to the head and extending toward the handle, and a clamp mounted on the handle and connected to the brace.

2. The combination with an ax comprising a head having a handle and curved adjacent to the head toward the rear face thereof; of a brace between the handle and the head at the side opposite to the cutting edge.

3. An ax comprising a poll handle, a head mounted thereon, a clevis clamp mounted on the handle at a spaced distance from the handle, a bolt clamping said clevis in position, said head having a threaded socket, a brace having portions straddling the handle and engaging said bolt, and means engaged through the opposite end of the brace and with the head for detachably connecting the brace between the handle and the head.

4. A brace of the class described comprising a clamp adapted to be mounted on the handle of an ax adjacent to the head thereof, a bolt connecting opposed portions of the clamp, a substantially Y-shaped brace having the branches thereof apertured for engagement by said bolt, said brace being curved throughout the length thereof and having the opposite end provided with a shank portion formed with an eye at its extremity, and a fastening member engaged through said eye and adapted to engage an ax head.

In testimony whereof that I claim the foregoing as my own, I have hereto affixed my signature in the presence of two witnesses.

JOHN H. YOUNG.

Witnesses:
LENORA YOUNG,
LURA L. FERRIS.